(12) United States Patent
Lima et al.

(10) Patent No.: US 10,495,770 B2
(45) Date of Patent: Dec. 3, 2019

(54) INDIVIDUAL ACTUATION WITHIN A SOURCE SUBARRAY

(71) Applicant: PGS Geophysical AS, Oslo (NO)

(72) Inventors: Jostein Lima, Oslo (NO); Tilman Kluver, Oslo (NO); Stian Hegna, Oslo (NO)

(73) Assignee: PGS Geophysical AS, Oslo (NO)

( * ) Notice: Subject to any disclaimer, the term of this patent is extended or adjusted under 35 U.S.C. 154(b) by 178 days.

(21) Appl. No.: 15/344,669

(22) Filed: Nov. 7, 2016

(65) Prior Publication Data

US 2017/0176620 A1    Jun. 22, 2017

Related U.S. Application Data

(60) Provisional application No. 62/268,020, filed on Dec. 16, 2015.

(51) Int. Cl.
*G01V 1/38* (2006.01)
*G01V 1/00* (2006.01)

(52) U.S. Cl.
CPC ............ *G01V 1/3861* (2013.01); *G01V 1/006* (2013.01); *G01V 2210/127* (2013.01)

(58) Field of Classification Search
CPC .... G01V 1/005; G01V 1/3808; G01V 1/3861; G01V 1/006
USPC .................................................... 367/20, 23
See application file for complete search history.

(56) References Cited

U.S. PATENT DOCUMENTS

| | | | |
|---|---|---|---|
| 3,281,767 A | 10/1966 | Cryar | |
| 3,286,225 A | 11/1966 | Huckabay et al. | |
| 9,678,230 B2* | 6/2017 | Mandroux | G01V 1/02 |
| 9,958,564 B2* | 5/2018 | Grenie | G01V 1/3808 |
| 2003/0168277 A1 | 9/2003 | Hopperstad et al. | |
| 2004/0013037 A1* | 1/2004 | Vaage | G01V 1/006 367/21 |
| 2012/0014212 A1 | 1/2012 | Eick et al. | |
| 2012/0147701 A1 | 6/2012 | Ross et al. | |
| 2012/0320711 A1* | 12/2012 | Hite | G01V 1/3808 367/16 |
| 2014/0016435 A1 | 1/2014 | Ruet | |
| 2014/0112097 A1 | 4/2014 | Dowle et al. | |
| 2014/0204707 A1* | 7/2014 | Tonchia | G01V 1/3808 367/17 |
| 2014/0340983 A1 | 11/2014 | Parkes et al. | |
| 2014/0362663 A1* | 12/2014 | Jones | G01V 1/005 367/21 |

(Continued)

FOREIGN PATENT DOCUMENTS

| | | |
|---|---|---|
| CN | 204287498 | 4/2015 |
| WO | 2015/158620 | 10/2015 |

OTHER PUBLICATIONS

International Search Report & Written Opinion for related PCT Application PCT/EP2016/081051, dated May 24, 2017 (22 pgs).

(Continued)

*Primary Examiner* — Ian J Lobo

(57) ABSTRACT

Source element of a source subarray can be individually actuated according to an actuation sequence. The actuation sequence can be at least partially based on a relative position of each of the source elements within a particular geometry of the source subarray with respect to a previously actuated source element and a towing velocity of the source subarray.

26 Claims, 12 Drawing Sheets

(56) References Cited

U.S. PATENT DOCUMENTS

2015/0260867 A1   9/2015   Abma et al.
2015/0293241 A1   10/2015  Hegna et al.
2016/0047922 A1   2/2016   Parkes et al.

OTHER PUBLICATIONS

International Preliminary Report on Patentability for related PCT Application PCT/EP2016/081051, dated Jun. 28, 2018 (15 pgs).
First Chinese Office Action for related Chinese Application No. 201680081963.6 dated Aug. 21, 2019 (Original Copy and Translated Version attached); 12 pgs total.

* cited by examiner

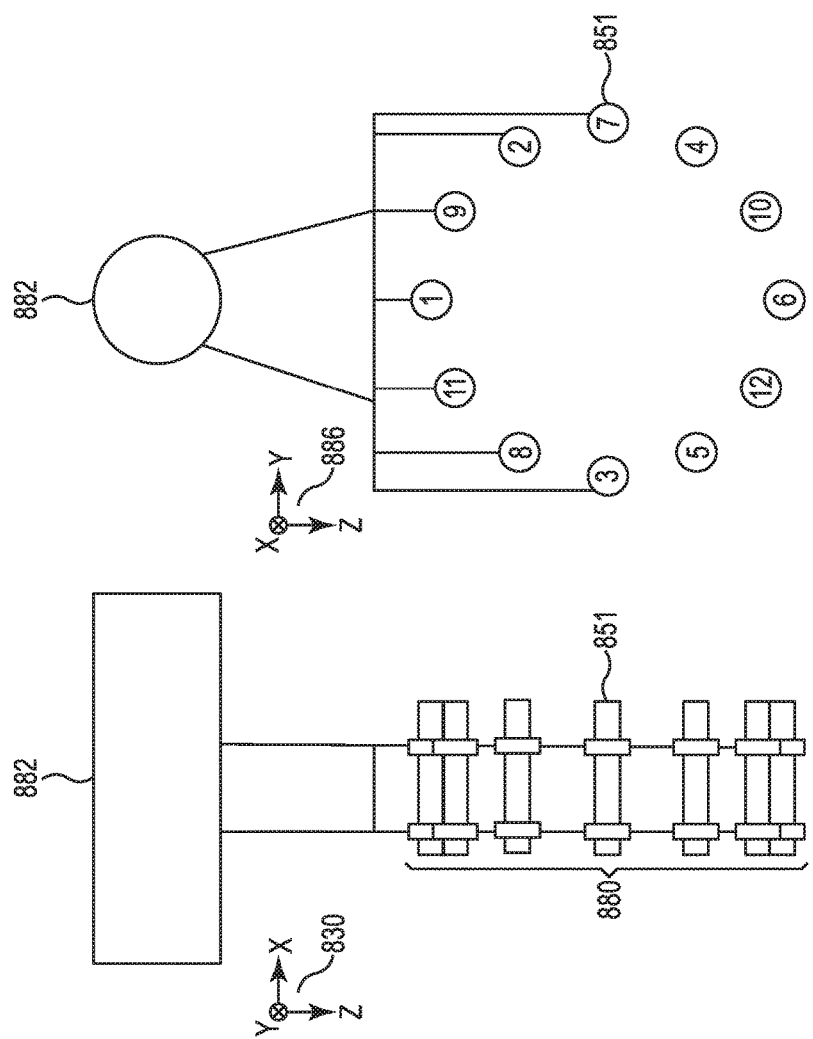

1488

INDIVIDUALLY ACTUATING SOURCE ELEMENTS OF A SOURCE SUBARRAY ACCORDING TO AN ACTUATION SEQUENCE, WHEREIN THE ACTUATION SEQUENCE IS AT LEAST PARTIALLY BASED ON: A RELATIVE POSITION OF EACH OF THE SOURCE ELEMENTS WITHIN A PARTICULAR GEOMETRY OF THE SOURCE SUBARRAY WITH RESPECT TO A PREVIOUSLY ACTUATED SOURCE ELEMENT; AND A TOWING VELOCITY OF THE SOURCE SUBARRAY

Fig. 14

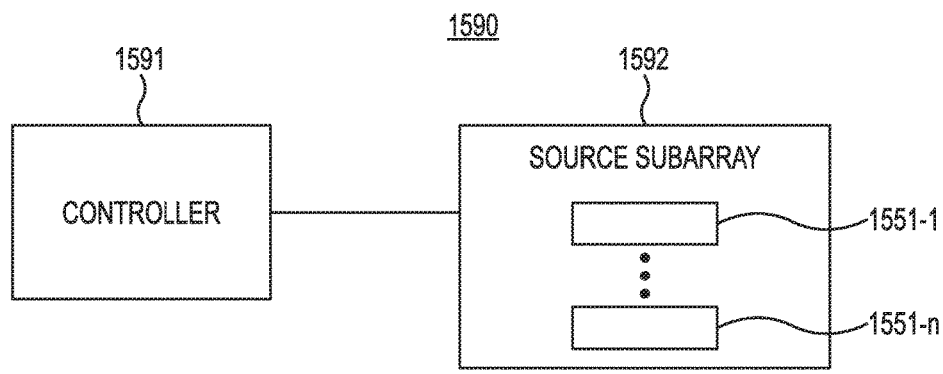

Fig. 15

INDIVIDUAL ACTUATION WITHIN A SOURCE SUBARRAY

CROSS-REFERENCE TO RELATED APPLICATIONS

This application claims priority to U.S. Provisional Application 62/268,020, filed Dec. 16, 2015, which is incorporated by reference.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more sources below the water surface and over a subterranean formation to be surveyed for mineral deposits. Receivers may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be air guns, marine vibrators, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the water surface. The receivers thereby measure a wavefield that was initiated by the actuation of the source.

BRIEF DESCRIPTION OF THE DRAWINGS

FIG. 8A illustrates an xz-plane view of a source subarray with source elements arranged in a substantially elliptical shape.

FIG. 8B illustrates a yz-plane view of a source subarray with source elements arranged in a substantially elliptical shape and an example actuation sequence.

FIG. 14 illustrates a method for individual actuation within a source subarray.

FIG. 15 illustrates a system for individual actuation within a source subarray.

DETAILED DESCRIPTION

Figure 1:
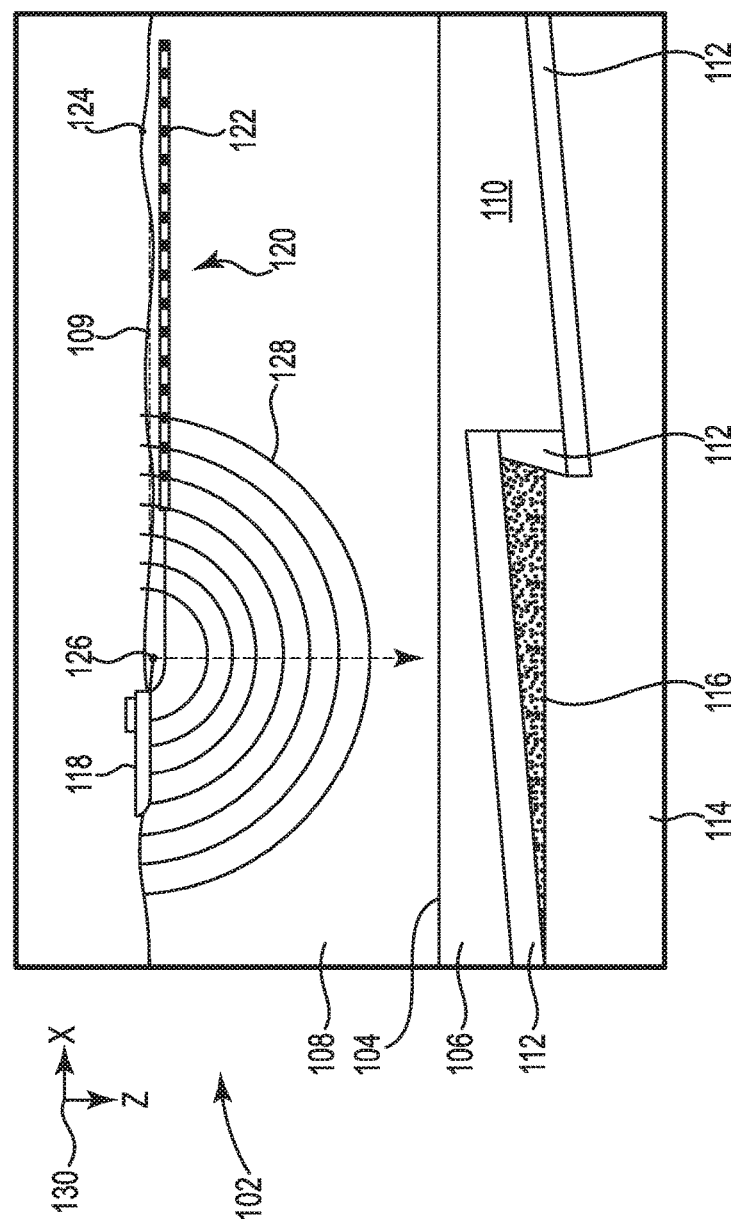
FIG. 1 illustrates an elevation or xz-plane view of marine surveying in which acoustic signals are emitted by a source for recording by receivers for processing and analysis in order to help characterize the structures and distributions of features and materials underlying the solid surface of the earth.

This disclosure is related generally to the field of marine surveying. Marine surveying can include, for example, seismic and/or electromagnetic surveying, among others. For example, this disclosure may have applications in marine surveying, in which one or more source elements are used to generate wave-fields, and sensors (towed and/or ocean bottom) receive energy generated by the source elements and affected by the interaction with a subsurface formation. The sensors thereby collect survey data, which can be useful in the discovery and/or extraction of hydrocarbons from subsurface formations.

The general term source is used herein to include source elements, source units, source arrays, and source subarrays. Source elements can be individual sources such as an air gun, electromagnetic source, or marine vibrator, among others. Source units can be multiple source elements that are actuated together. Source arrays can be multiple source elements and/or multiple source units that can be actuated separately. A source array can also comprise an array of source elements partitioned into subsets of source elements called source subarrays. A source subarray is a portion of a source array such as those source elements that are disposed along a cable towed by a vessel. The source subarrays can be towed approximately parallel to the direction that the vessel is traveling. Source elements can have different sizes and multiple source elements may be disposed in a same position along the cable. For example, one or more source elements can be arranged such that they are coupled to the source subarray at a same position.

Source subarrays can have different lengths, such as ten to twenty meters in length. Source elements of a source unit can be coupled at a same position so that they can be actuated simultaneously and/or concurrently as the source unit, which may also be referred to as a cluster. The source elements that are coupled to the source subarray at a same position can be actuated independently of other source elements that are coupled to the same position. For example, one or more source elements that are coupled to a same position along the source subarray can be actuated in the event that one of the other source elements that are coupled to the same source location along the cable fails to actuate.

In some approaches to marine geophysical data acquisition, source elements towed along a source subarray may be actuated simultaneously. If the source elements are actuated at different times, then the water column surrounding one or more of the source elements may be affected by a disturbance, such as air bubbles, caused by another source element. For example, the water column surrounding one or more of the source elements may be affected by air in the water as a result of the actuation of a source element at an earlier time as discussed below with reference to FIGS. 3-7B. The effects of air bubbles caused by the release of air by the source elements may cause complex and/or unpredictable effects on a wavefield emitted by a source element.

Source elements can be actuated at different times in a continuous or near-continuous sequence so that an actuation sequence can cycle or "loop" through source elements that are available to be actuated. An actuation sequence can include individually actuating each source of a source subarray at different times but with as close as a separation in time as possible. Individually actuating each source of a source subarray at different times but with as close as a separation in time as possible can cause a source wavefield to approach white noise, which can stabilize the deconvolution of the source wavefield. An actuation sequence can include avoiding actuating a source element in a location that might be contaminated with a disturbance from a previous actuation of a source element.

As used herein, "near-continuous" can include without meaningful breaks in the actuation sequence or between the actuations of individual source elements. As would be understood by one of ordinary skill in the art with the benefit of this disclosure, operational circumstances can cause intermittent gaps between actuations (due to equipment failure, etc.), and "near-continuous actuation sequence" and "near-continuous actuation of the source elements" should be read to include actuations with intermittent or periodic gaps, whether planned or unplanned as well as actuations without intermittent or periodic gaps, thus including "continuous actuation sequence" and "continuous actuation of the source elements." For simplicity, the term "near-continuous" and "near-continuously" will be used herein and do not exclude "continuous" or "continuously."

A source element may be actuated in a location where another source element was previously actuated because the source element is moving through the water. Because a source array may be towed behind the vessel with some speed, it may be desirable to have a gap in time between actuations of the source elements that is long enough to avoid actuating a source element in a location that is close to the location of a previous actuation of a source element. For example, if the towing velocity of a source subarray is two meters per second (m/s), the distance between a first source element and a second source element of the source subarray is two meters, and the second source element is actuated one second after the actuation of the first source element, then the second source element would be actuated in the location where the first source element was actuated. The water in the area surrounding the second source element may be contaminated with a disturbance. To actuate the second source element away from the disturbance, for example at a distance of at least two meters away from the location where the first source element was actuated, the second source element may be actuated at least two seconds after than the actuation of the first source element. However, this time difference may be such that the actuations of the source elements are no longer considered to be a continuous or near-continuous actuation sequence.

In an effort to overcome the above described shortcomings, at least one embodiment in accordance with the present disclosure can include arranging the source elements associated with a particular source subarray in a particular geometry and actuating each of the source elements according to an actuation sequence. The actuation sequence can be at least partially based on a relative position of each source element within the particular geometry of the source subarray with respect to a previously actuated source element, and a towing velocity of the source subarray. Thus, a marine survey can be conducted via continuous or near-continuous actuations of the source elements and the time interval between actuations of individual source elements can be reduced or minimized, for example one second or less.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (having the potential to, being able to), not in a mandatory sense (must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine surveying in which acoustic signals are emitted by a source 126 for recording by receivers 122 for processing and analysis in order to help characterize the structures and distributions of features and materials underlying the solid surface of the earth. FIG. 1 shows a domain volume 102 of the earth's surface comprising a solid volume 106 of sediment and rock below the solid surface 104 of the earth that, in turn, underlies a fluid volume 108 of water having a water surface 109 such as in an ocean, an inlet or bay, or a large freshwater lake. The domain volume 102 shown in FIG. 1 represents an example experimental domain for a class of marine surveys, such as marine seismic surveys. FIG. 1 illustrates a first sediment layer 110, an uplifted rock layer 112, second, underlying rock layer 114, and hydrocarbon-saturated layer 116. One or more elements of the solid volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the water surface 109. The streamers 120 can be long cables containing power and data-transmission lines (electrical, optical fiber, etc.) to which receivers may be connected. In one type of marine survey, each receiver, such as the receiver 122 represented by the shaded disk in FIG. 1, comprises a pair of sensors including a motion sensor that detects particle displacement within the water by detecting particle motion variation, such as velocities or accelerations, and/or a hydrophone that detects variations in pressure. The streamers 120 and the marine survey vessel 118 can include sophisticated sensing electronics and data-processing facilities that allow receiver readings to be correlated with absolute positions on the water surface and absolute three-dimensional positions with respect to a three-dimensional coordinate system. In FIG. 1, the receivers along the streamers are shown to lie below the water surface 109, with the receiver positions correlated with overlying surface positions, such as a surface position 124 correlated with the position of receiver 122. The marine survey vessel 118 can also tow one or more sources 126 that produce acoustic signals as the marine survey vessel 118 and streamers 120 move across the water surface 109. Sources 126 and/or streamers 120 may also be towed by other vessels, or may be otherwise disposed in fluid volume 108. For example, receivers may be located on ocean bottom cables or nodes fixed at or near the solid surface 104, and sources 126 may also be disposed in a nearly-fixed or fixed configuration. For the sake of efficiency, illustrations and descriptions herein show seismic receivers located on streamers, but it should be understood that references to seismic receivers located on a "streamer" or "cable" should be read to refer equally to seismic receivers located on a towed streamer, an ocean bottom receiver cable, and/or an array of nodes.

FIG. 1 shows an expanding, spherical acoustic signal, illustrated as semicircles of increasing radius centered at the source 126, representing a down-going wavefield 128, following an acoustic signal emitted by the source 126. The down-going wavefield 128 is, in effect, shown in a vertical plane cross section in FIG. 1. The outward and downward expanding down-going wavefield 128 may eventually reach the solid surface 104, at which point the outward and downward expanding down-going wavefield 128 may partially scatter, may partially reflect back toward the streamers 120, and may partially refract downward into the solid volume 106, becoming elastic acoustic signals within the solid volume 106.

Figure 2:
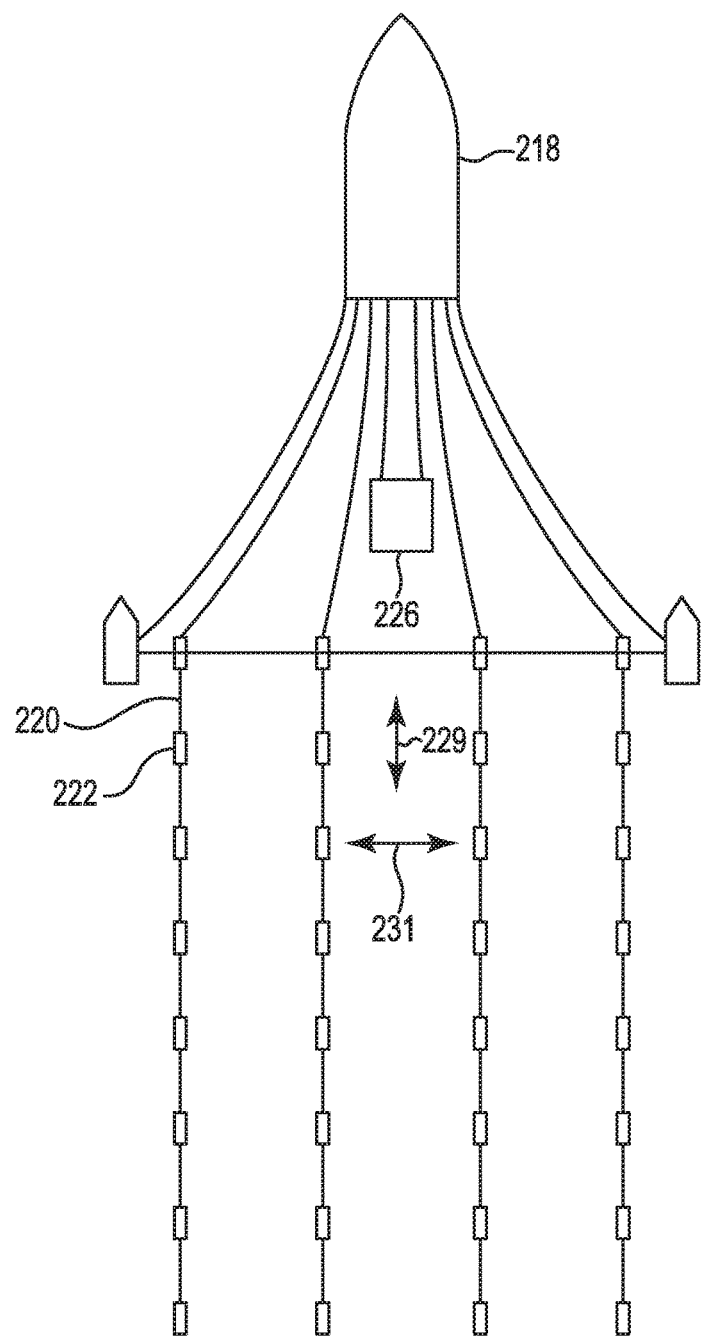
FIG. 2 illustrates a top view of marine surveying.

FIG. 2 illustrates a top view of marine surveying. FIG. 2 shows an example of a marine survey vessel 218, analogous to the marine survey vessel 118 illustrated in FIG. 1, equipped to carry out marine surveys. The marine survey vessel 218 can tow one or more streamers 220, analogous to the streamer 120 illustrated in FIG. 1. The streamers can include one or more receivers 222, analogous to the receivers 122 illustrated in FIG. 1. The marine survey vessel can tow one or more sources 226, analogous to the sources 126 illustrated in FIG. 1. The recorded data can be three-dimensional in that it includes data from wavefields traveling in both an inline direction 229 and a cross-line direction 231, plus depth. The inline direction 229 is generally in line with the one or more sources 226 with respect to a direction of travel of the marine survey vessel 218 and/or with respect to a length of receivers 222 along a streamer 220 or ocean bottom cable. The cross-line direction 231 is generally perpendicular to the inline direction 229 and crosses the length of receivers 222 along a streamer 220 or ocean bottom cable. The streamers 220 or ocean bottom cables are generally spaced apart in the cross-line direction 231. In at least one embodiment, the streamers 220 can be towed in a curved path.

The marine survey vessel 218 can include a control system and a recording system, which may be separate systems that communicate data between each other, or they may be sub-systems of an integrated system. The control system can be configured to selectively actuate the sources 226, while the recording system can be configured to record the signals generated by receivers 222 in response to the energy imparted into the water and thereby into subterranean material formations below the solid surface. The recording system can be configured to determine and record the geodetic positions of the sources and the receivers 222 at any time.

Source actuation and signal recording by the receivers 222 may be repeated a plurality of times while the marine survey vessel 218 moves through the water. Each actuation record may include, for each receiver 222, signals corresponding to the energy produced by the source 226.

Figure 3:
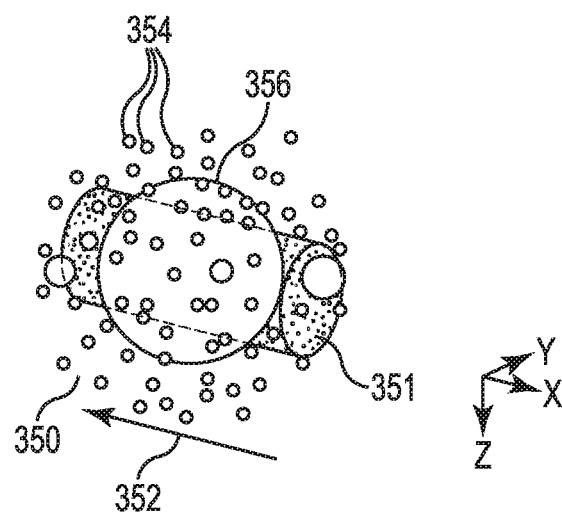
FIG. 3 illustrates a perspective view of a source element during actuation while the source element travels in a direction at vessel speed.

FIG. 3 illustrates a perspective view of a source element 351 during actuation while the source element 351 travels in a direction 352 at a towing velocity. As the source element 351 is actuated, air is rapidly forced out through one or more openings located on an end, or along the side, of the source element 351 forming a complex combination of large bubbles, such as the large bubble 356, and many smaller bubbles 354 forming a foam of air, shown as foam 350, around the larger bubbles. High pressure in the large bubble 356 generates acoustic pressure waves that radiate outward. In other words, when the large bubble 356 is injected into the water from the source element 351 there is a radial displacement of water from the center of the large bubble 356 and a pressure disturbance propagates outward. As the large bubble 356 expands the pressure of the air in the large bubble 356 drops below that of the surrounding fluid, but inertia causes the large bubble 356 to over expand so that the air pressure in the large bubble 356 is less than the pressure of the surrounding water. Then the large bubble 356 contracts due to the pressure of the surrounding water. This process of expansion and contraction continues with the large bubble 356 oscillating through many cycles with pressure waves radiating outward into the water. The amplitude of the pressure wave decreases with time.

Figure 4:
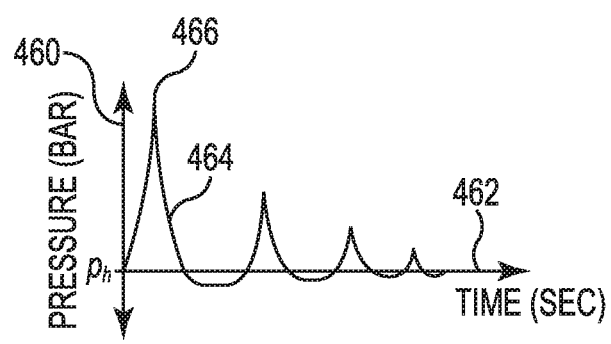
FIG. 4 illustrates a plot of a near-field signature of a source element measured by a pressure sensor located in close proximity to the source element.

FIG. 4 illustrates a plot of a near-field signature 464 of a source element 351 measured by a pressure sensor located in close proximity to the source element 351. The horizontal axis 462 represents time, the vertical axis 460 represents pressure, and the curve 464 represents the near-field signature of the pressure wave emitted from the source element 351. The near-field signature 464 represents changes in the pressure amplitude of the bubble output from the source element 351. The first peak 466 corresponds to the initial build-up and release of pressure in a bubble output from the source element 351 into the water, after which, subsequent peaks represent a decrease in amplitude with increasing time. The near-field signature reveals that the pressure falls below the hydrostatic pressure, $p_h$, between peaks. The bubble oscillation amplitude decreases as time passes and the bubble period of oscillation is not constant from one cycle to the next. In other words, the bubble motion is not simple harmonic motion. The chamber volume of source element 351 determines the associated near-field signature, which is also influenced by the pressure waves created by other source elements 351 of the source subarray. In general, the larger the chamber volume the larger the peak amplitudes and the longer the bubble periods of the associated near-field signatures.

Figure 5:
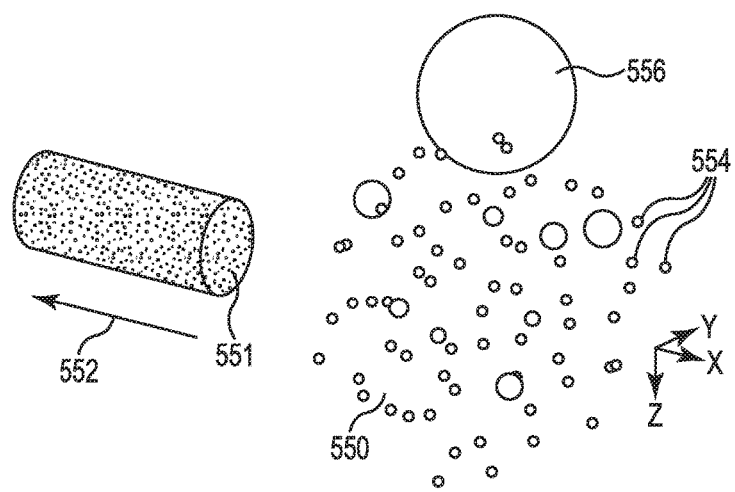
FIG. 5 illustrates a perspective view of a source element a short time after the actuation depicted in FIG. 3.

FIG. 5 illustrates a perspective view of a source element 551 a short time after the actuation depicted in FIG. 3. As the source element 551 continues to move in the direction 552, the large bubble 556 rises through the water faster than the smaller bubbles 554. The water creates drag that essentially stops the large bubble 556 and the smaller bubbles 554 from moving forward behind the source element 551. Over time the foam 550 expands to fill an air/water volume with many of the smaller bubbles 554 remaining in the air/water volume around and above the location where the source element 551 was actuated.

The pressure waves output from the source elements 551 combine to form a source wavefield, which is the acoustic signal that illuminates a subterranean formation as described above with reference to FIG. 1. The source elements 551 within a source subarray may be selected with different chamber volumes, spacings, and positions in order to generate a desirable source wavefield.

Figure 6:
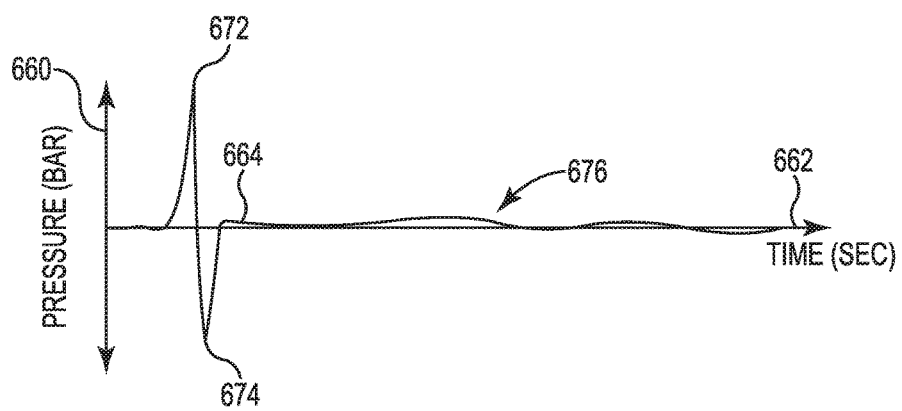
FIG. 6 illustrates a plot of a source wavefield in a vertical direction.

FIG. 6 illustrates a plot of a source wavefield in a vertical direction. The horizontal axis 662 represents time, the vertical axis 660 represents pressure, and the curve 664 represents a resulting far-field amplitude of the source wavefield, for the case in which all the source elements 551 in the array are fired simultaneously. The far-field amplitude 664 has a large primary peak 672 and a ghost peak 674 followed in time by very small amplitude oscillations 676. The primary peak 672 represents the portion of the source wavefield that travels directly to the subterranean formation while the ghost peak 674 represents the portion of the source wavefield that is reflected from the water surface and is responsible for source ghost contamination of the wavefields measured by the receivers 122, as illustrated in FIG. 1.

A source wavefield created by simultaneously activating the source elements of a moving source array are not adversely affected by air bubbles created by previous simultaneous actuations of the source array because the air-bubbles from previous actuations remain at the location where the source array was previously actuated. On the other hand, when the source elements of a moving source array are actuated at different times within a short time interval (a few seconds or less), the water column surrounding a next to be actuated source element may be filled with air bubbles caused by one or more neighboring source elements that were actuated at earlier times. The air-bubbles may create very complex and unpredictable effects on the wavefield emitted by the source element to be actuated next. Some of these effects may be related to the complexity of the medium caused by the mixture of air bubbles and water, with air bubbles of different sizes and large density and velocity contrasts between air and water, causing scattering, attenuation and propagation effects. As a result, this component of the source wavefield may become unpredictable, variable, and/or chaotic.

Figure 7A:
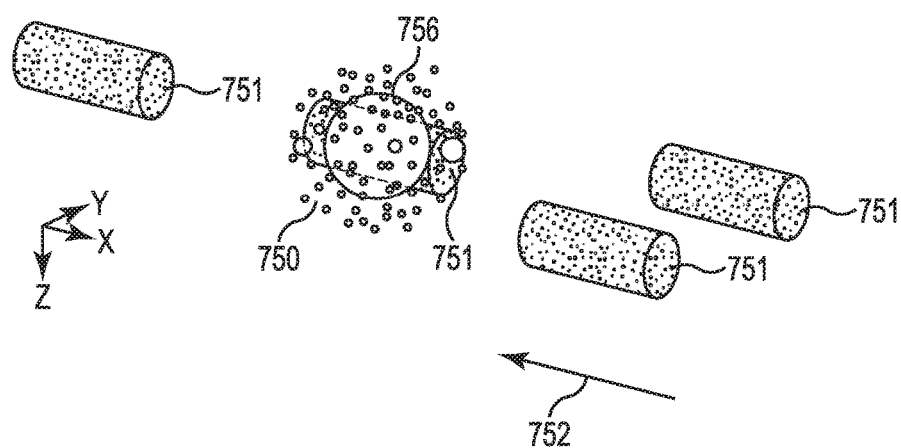
FIG. 7A illustrates an actuated source element as depicted in the FIG. 3 surrounded by three other source elements of a source subarray traveling in the same direction.
Figure 7B:
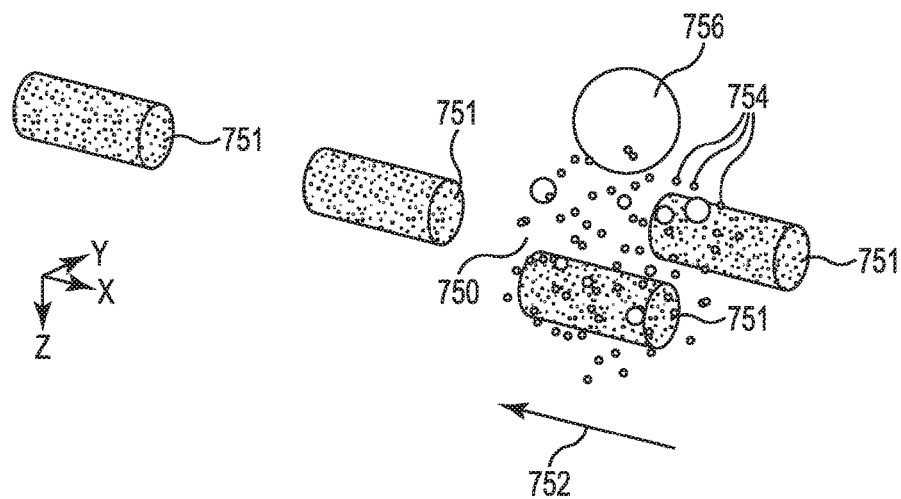
FIG. 7B illustrates source elements passing through a foam of small air bubbles.

FIG. 7A illustrates an actuated source element 751 as depicted in the FIG. 3 surrounded by three other source elements 751 of an array traveling in the same direction 752. FIG. 7B illustrates source elements 751 passing through a foam 750 of small air bubbles. The large bubble 756 and the small air bubbles 754 create an air/water volume in close proximity to the source elements 751. The air/water volume impacts bubble oscillation of air injected by the source elements 751. As a result, acoustic energy that travels downward and away from the source elements 751 passes through the air/water volume and is subjected to unpredictable perturbations. In addition, the source ghost (water surface reflected energy) created by the source elements 751 cannot be accurately estimated because the air/water volume above the source elements 751 creates unpredictable perturbations in the acoustic energy traveling upward from the source elements 751. The effects may make it difficult to accurately determine the total three-dimensional wavefield emitted from a source with the source elements actuated at different times, which in turn leads to an inevitable reduction in the quality in any final seismic images.

Methods and systems described below are directed to particular geometries of source elements of a source subarray and actuation sequences. An example of a source element is an air gun. A source subarray can be composed of a single source element, two source elements, or more. An actuation sequence can be at least partially based on a relative position of each source element within a particular geometry of a source subarray with respect to a previously actuated source element. An actuation sequence can also be at least partially based on the towing velocity of the source subarray.

Examples of the particular geometry include, but are not limited to, those illustrated in FIGS. 8A-12B. For example, the particular geometry can comprise four of the source elements in a single inline position along the source subarray. Another example of the particular geometry can comprise a first source element at a first cross-line position and a second source element at a second cross-line position, wherein the first cross-line position is different than the second cross-line position. The particular geometry can also comprise a first source element at a first depth and a second source element at a second depth, wherein the first depth is different than the second depth.

FIG. 8A illustrates an xz-plane 830 view of a source subarray 880 with source elements 851 arranged in a substantially elliptical shape. As used herein, "arranged in a substantially elliptical shape" is intended to mean arranged along a curve that surrounds two focal points such that the sum of the distances to the two focal points is substantially constant for every point on the curve. The source subarray 880 can be coupled to a floatation device 882, which can be a buoy.

FIG. 8B illustrates a yz-plane 886 view of a source subarray 880 with source elements 851 arranged in a substantially elliptical shape and an example actuation sequence. The embodiment shown in FIG. 8B comprises twelve source elements 851 equally spaced along a circle. A circle is a substantially elliptical shape where the two focal points are in the substantially same location. However, embodiments in accordance with the present disclosure are not so limited and can include the source elements 851 having varied spacing and can be along any elliptical shape. Additionally, the quantity of source elements 851 comprising the source subarray 880 is not limited to twelve.

The numbers within the circles representing the source elements 851 correspond to an example actuation sequence. As used herein, "actuation sequence" is intended to mean a sequence, or an order, of actuations of source elements, such as the source elements 851, of a source subarray, such as the source subarray 880. Each of the source elements 851 can be actuated individually such that the source element 851 labeled "1" is actuated first, then the source element 851 labeled "2" is actuated second, and so on until all of the source elements 851 have been actuated. The actuation of the source elements 851 can be repeated according to the actuation sequence after all of the source elements 851 of the source subarray 880 have been actuated.

Figure 9B:
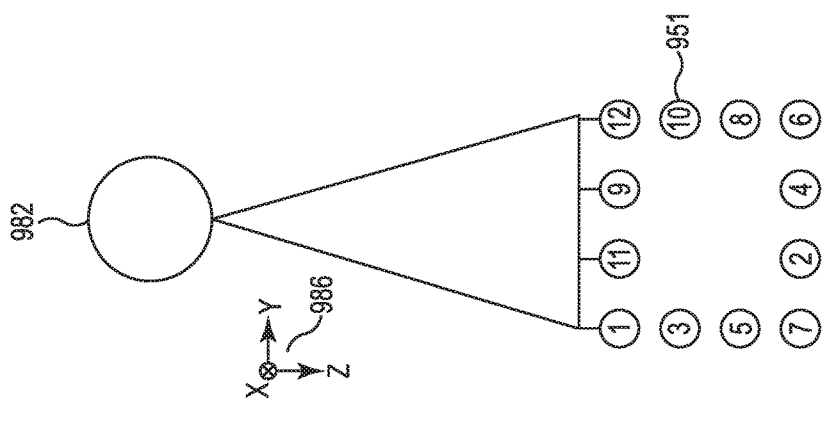
FIG. 9B illustrates a yz-plane view of a source subarray with source elements arranged in a substantially rectangular shape and an example actuation sequence.
Figure 9A:
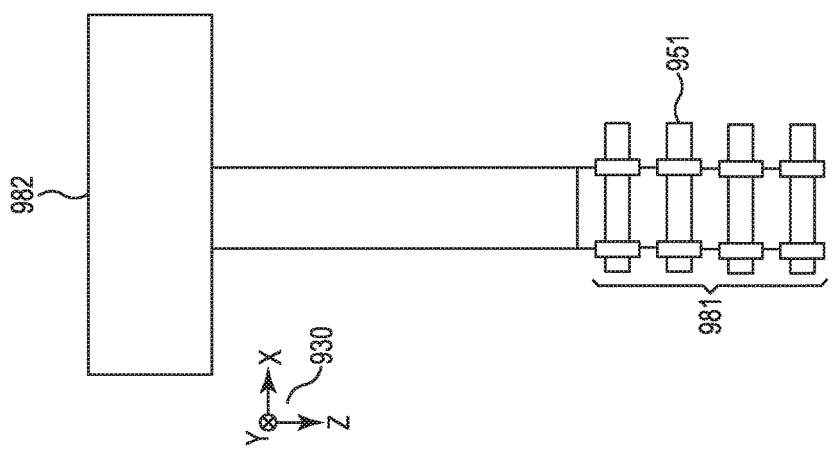
FIG. 9A illustrates an xz-plane view of a source subarray with source elements arranged in a substantially rectangular shape.

FIG. 9A illustrates an xz-plane 930 view of a source subarray 981 with source elements 951 arranged in a substantially rectangular shape. As used herein, "arranged in a substantially rectangular shape" is intended to mean arranged along a polygon with four sides where the four sides form four angles of substantially ninety degrees. The source subarray 981 can be coupled to a floatation device 982, which can be a buoy.

FIG. 9B illustrates a yz-plane 986 view of a source subarray 981 with source elements 951 arranged in a substantially rectangular shape and an example actuation sequence. The embodiment shown in FIG. 9B comprises twelve source elements 951 equally spaced along a square. A square is a substantially rectangular shape where the four sides have substantially the same length. However, embodiments in accordance with the present disclosure are not so limited and can include the source elements 951 having varied spacing and can be along any rectangular shape. Additionally, the quantity of source elements 951 comprising the source subarray 981 is not limited to twelve.

The numbers within the circles representing the source elements 951 correspond to an example actuation sequence. Each of the source elements 951 can be actuated individually such that the source element 951 labeled "1" is actuated first, then the source element 951 labeled "2" is actuated second, and so on until all of the source elements 951 have been actuated. The actuation of the source elements 951 can be repeated according to the actuation sequence after all of the source elements 951 of the source subarray 981 have been actuated.

Figure 10B:
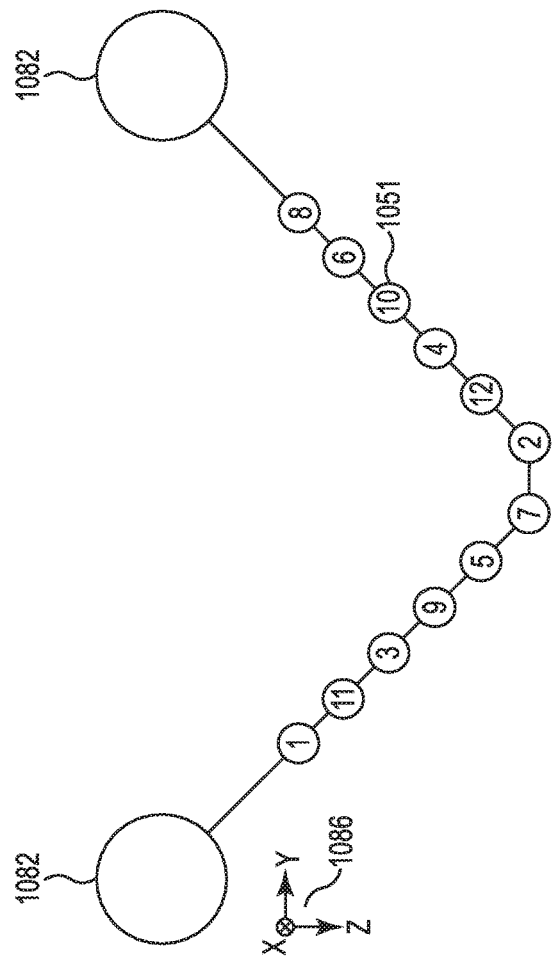
FIG. 10B illustrates a yz-plane view of a source subarray with source elements arranged in a "V" shape and an example actuation sequence.
Figure 10A:
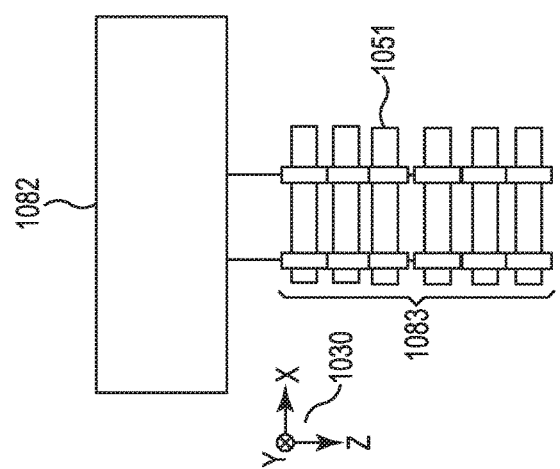
FIG. 10A illustrates an xz-plane view of a source subarray with source elements arranged in a "V" shape.

FIG. 10A illustrates an xz-plane 1030 view of a source subarray 1083 with source elements 1051 arranged in a "V" shape. As used herein, "arranged in a 'V' shape" is intended to mean arranged along two lines where the two lines share a common endpoint and the angle between the two lines is less than one hundred eighty degrees. The source subarray 1083 can be coupled to one or more floatation devices 1082, which can be buoys.

FIG. 10B illustrates a yz-plane 1086 view of a source subarray 1083 with source elements 1051 arranged in a "V" shape and an example actuation sequence. The embodiment shown in FIG. 10B comprises twelve source elements 1051 equally spaced along the two lines. Embodiments in accordance with the present disclosure can include the source elements 1051 having varied spacing along the two lines. Additionally, the quantity of source elements 1051 comprising the source subarray 1083 is not limited to twelve.

The numbers within the circles representing the source elements 1051 correspond to an example actuation sequence. Each of the source elements 1051 can be actuated individually such that the source element 1051 labeled "1" is actuated first, then the source element 1051 labeled "2" is actuated second, and so on until all of the source elements 1051 have been actuated. The actuation of the source elements 1051 can be repeated according to the actuation sequence after all of the source elements 1051 of the source subarray 1083 have been actuated.

Figure 11A:
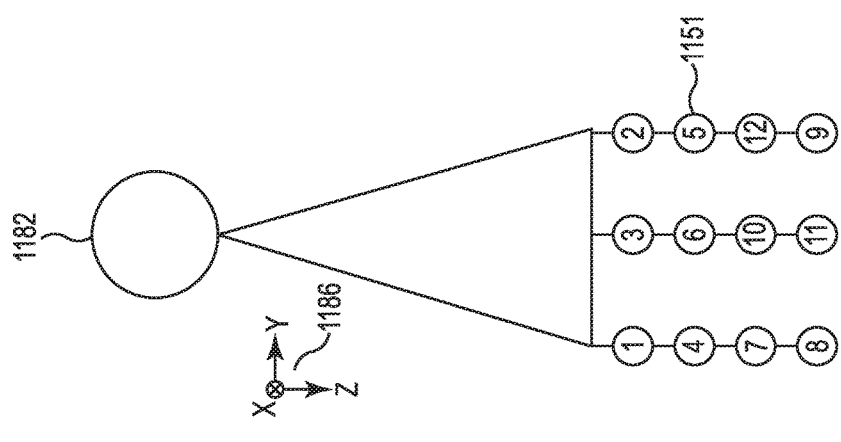
FIG. 11A illustrates an xz-plane view of a source subarray with source elements arranged along three lines.

FIG. 11A illustrates an xz-plane 1130 view of a source subarray 1184 with source elements 1151 arranged along three lines. The source subarray 1184 can be coupled to a floatation device 1182, which can be a buoy.

Figure 11B:
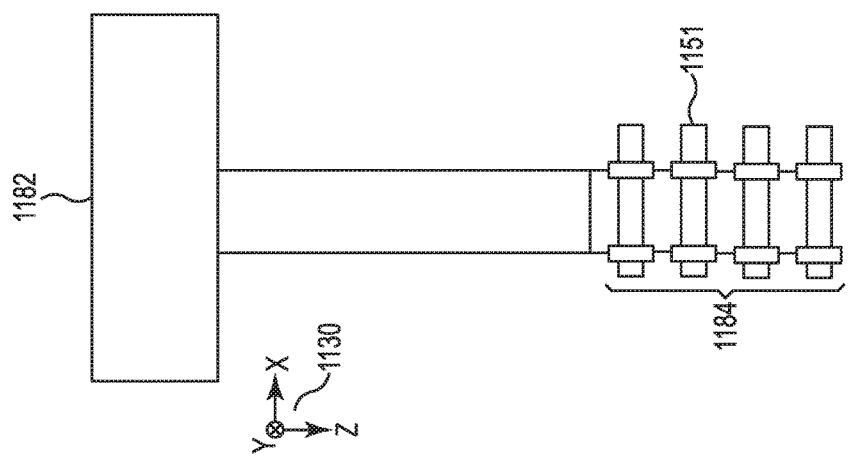
FIG. 11B illustrates a yz-plane view of a source subarray with source elements arranged along three lines and an example actuation sequence.

FIG. 11B illustrates a yz-plane 1186 view of a source subarray 1184 with source elements 1151 arranged along three lines and an example actuation sequence. The lines of any source subarray in accordance with the present disclosure, such as the source subarray 1184, can be substantially vertical with respect to a water surface and can be substantially parallel to each other. The embodiment shown in FIG. 11B comprises twelve source elements 1151 equally divided amongst three lines and equally spaced along the three lines. The cross-line separation between a first (left) line and a second (center) line can be equal to the cross-line separation between the second (center) line and a third (right) line. However, embodiments in accordance with the present disclosure are not so limited. The particular geometry can comprise the source elements arranged along at least one line. The source elements 1151 can have varied spacing along the at least one line. Additionally, the quantity of source elements 1151 comprising the source sub array 1184 is not limited to twelve.

The numbers within the circles representing the source elements 1151 correspond to an example actuation sequence. Each of the source elements 1151 can be actuated individually such that the source element 1151 labeled "1" is actuated first, then the source element 1151 labeled "2" is actuated second, and so on until all of the source elements 1151 have been actuated. The actuation of the source elements 1151 can be repeated according to the actuation sequence after all of the source elements 1151 of the source subarray 1184 have been actuated.

Figures 12A, 12B:
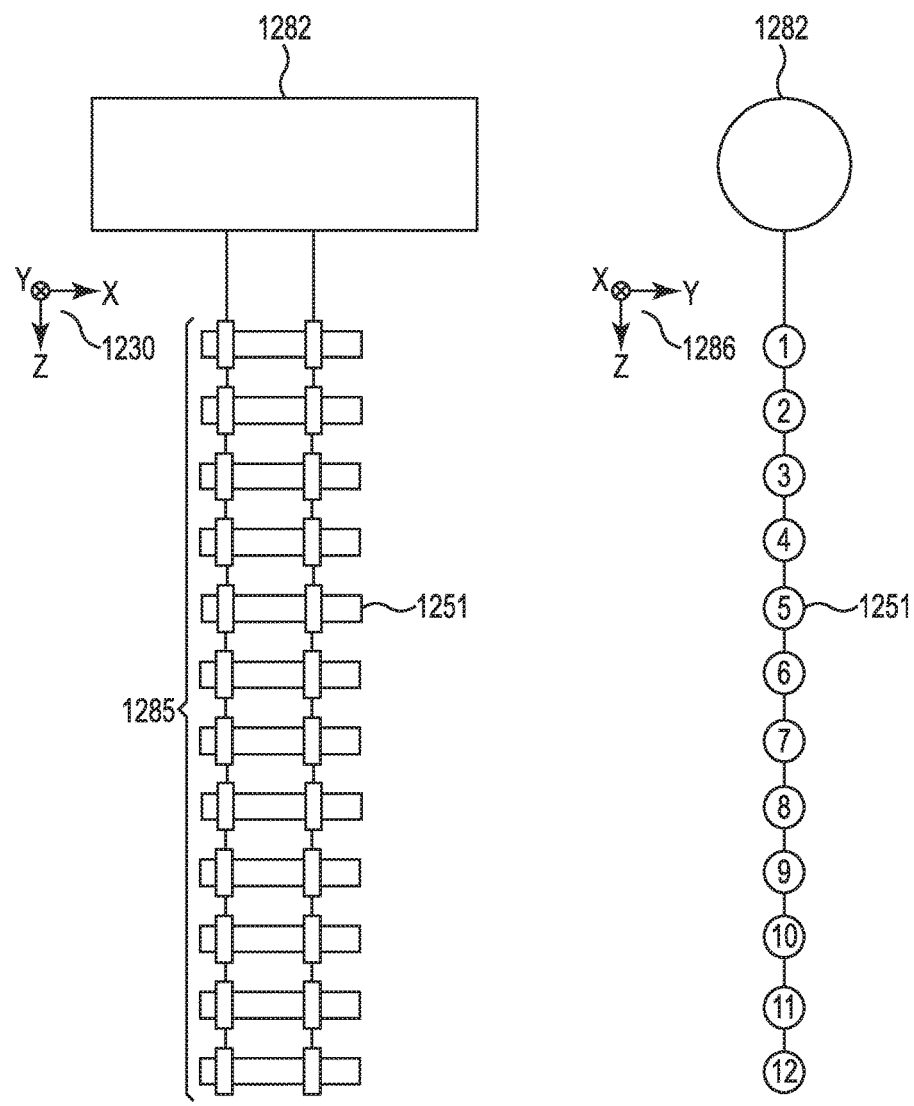
FIG. 12A illustrates an xz-plane view of a source subarray with source elements arranged along a single line.
FIG. 12B illustrates a yz-plane view of a source subarray with source elements arranged along a single line and an example actuation sequence.

FIG. 12A illustrates an xz-plane 1230 view of a source subarray 1285 with source elements 1251 arranged along a single line. The source subarray 1285 can be coupled to a floatation device 1282, which can be a buoy.

FIG. 12B illustrates a yz-plane 1286 view of a source subarray 1285 with source elements 1251 arranged along a single line and an example actuation sequence. The embodiment shown in FIG. 12B comprises twelve source elements 1251 equally spaced along a single vertical line. However, embodiments in accordance with the present disclosure are not so limited and can include the source elements 1251 having varied spacing and can be along a single line at an angle of less than ninety degrees with respect to a water surface. Additionally, the quantity of source elements 1251 comprising the source subarray 1285 is not limited to twelve.

The numbers within the circles representing the source elements 1251 correspond to an example actuation sequence such that the actuations begin with an initial source element 1251 that is disposed at an inline position along the single line that is closest to the water surface followed by actuating, in order along the single line, the source elements positionally subsequent to the initial source element. Each of the source elements 1251 can be actuated individually such that the source element 1251 labeled "1" is actuated first, then the source element 1251 labeled "2" is actuated second, and so on until all of the source elements 1251 have been actuated. The actuation of the source elements 1251 can be repeated according to the actuation sequence after all of the source elements 1251 of the source subarray 1285 have been actuated.

Figure 13:
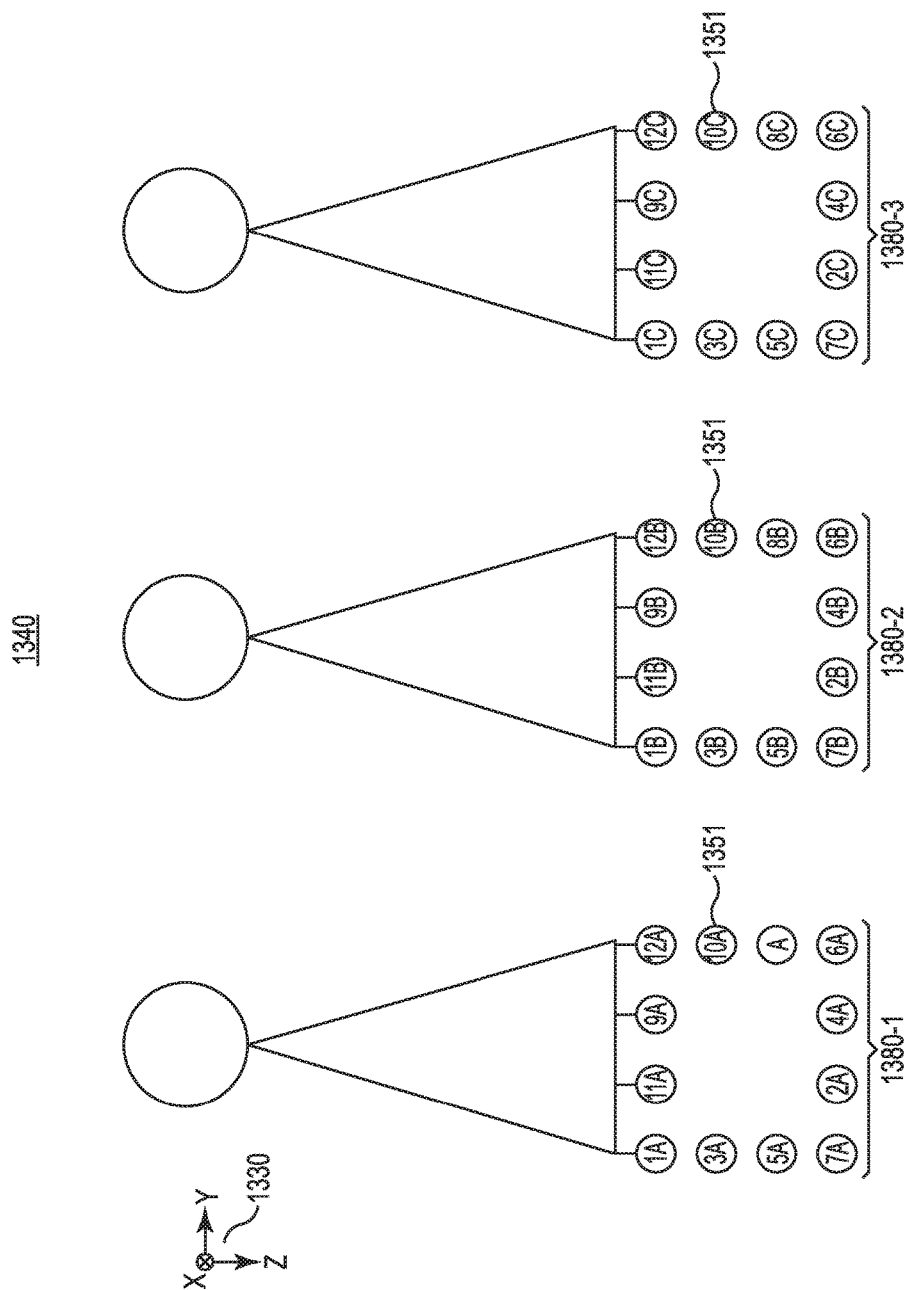
FIG. 13 illustrates a yz-plane view of a source array comprising a source subarray and additional source subarrays.

FIG. 13 illustrates a yz-plane 1330 view of a source array 1340 comprising a source subarray 1380-1 and additional source subarrays 1380-2 and 1380-3. The source array 1340 can comprise a source subarray 1380-1 and an additional source subarray 1380-2. The source array 1340 can comprise more than one additional source subarray 1380-2 and 1380-3 as depicted in FIG. 13. The source subarrays 1380-1, 1380-2, and 1380-3 can be analogous to the source subarray 880 as depicted in FIGS. 8A and 8B; however any source subarray in accordance with the present disclosure can be used. Although the source array 1330 can comprise the source subarray 1380-1 and the additional source subarrays 1380-2 and 1380-3 can each have a different particular geometry, such as the particular geometries of the source subarrays 880 and 981, it can be beneficial to use a single particular geometry in the source array 1330.

The source elements 1351 of the source array 1340 can be actuated according to the actuation sequence for the source subarray 1380-1 and the additional source subarrays 1380-2 and 1380-3 such that all of the source elements 1351 of the source subarray 1380-1 are actuated before any source element 1351 of the additional source subarrays 1380-2 and 1380-3 is actuated. The source elements 1351 of the additional source subarray 1380-2 can be then be actuated according to the actuation sequence.

As illustrated in FIG. 13, an actuation sequence for the source array 1340 can include actuating a first source element 1351 of a source subarray 1380-1 (denoted as 1A) and a first source element 1351 of each additional source subarray 1380-2 and 1380-3 (denoted as 1B and 1C, respectively) before actuating a second source element 1351 of the source subarray 1380-1 (denoted as 2A) and a second source element 1351 (denoted as 2B and 2C, respectively) of each additional source subarray 1380-2 and 1380-3. In other words, the actuation sequence can be actuating the source elements 1351 in the sequence of: 1A, 1B, 1C, 2A, 2B, 2C, and so on. After all of the source elements 1351 of the source array 1340 are actuated, the actuation sequence can then be repeated. Such an actuation sequence can minimize the time between the actuations of the source elements 1351. As an example, if each source element 1351 of the source array 1340 is actuated with a mean time interval of 0.1 seconds between actuations, then the mean time interval between the actuations of the source elements 1351 of the source subarray 1380-1 will be 0.3 seconds (0.1 seconds between the actuations of source elements 1351 denoted as 1A and 1B, 0.1 seconds between the actuations of source elements 1351 denoted as 1B and 1C, and 0.1 seconds between the actuations of source elements 1351 denoted as 1C and 2A, so that there are 0.3 seconds between the actuations of source elements 1351 denoted as 1A and 2A).

FIG. 14 illustrates a method for individual actuation within a source subarray. The method can comprise, at block 1488, individually actuating source elements of a source subarray according to an actuation sequence. The actuation sequence can be at least partially based on a relative position of each of the source elements within a particular geometry of the source subarray with respect to a previously actuated source element, and a towing velocity of the source subarray.

The action sequence can be at least partially based on a time interval between the actuations. The duration of the time interval can be less than a second. The duration of the time interval does not have to be the same throughout the actuation sequence. For example, a first time interval between a first pair of consecutive actuations can have a different duration than a second time interval between a second pair of consecutive actuations.

The duration of the time interval can be predetermined. As used herein, "predetermined" is intended to mean that the duration of the time interval is a known value set prior to beginning the actuation sequence. For example, the duration of the time interval can be set to 0.1 seconds prior to beginning the actuation sequence.

The duration of the time interval can vary randomly. For example, the duration of a first time interval between a first pair of consecutive actuations can be randomly different from the duration of a second time interval between a second pair of consecutive actuations.

The duration of the time interval can vary in a pseudorandom manner such that the durations of the time interval can vary randomly within a mean time interval plus a randomization range and the mean time interval minus the randomization range. If the mean time is 0.1 seconds and the randomization range is 0.05 seconds then the duration of the time interval can vary randomly between 0.95 seconds and 1.05 seconds. For example, the duration of a first time interval between a first pair of consecutive actuations can be 0.97 seconds and the duration of a second time interval between a second pair of consecutive actuations can be 1.01 seconds.

FIG. 15 illustrates a system 1590 for individual actuation within a source subarray. The system 1590 can comprise a source subarray 1592 comprising source elements 1551-1 through 1551-n. The source subarray 1592 can be analogous to any source subarray in accordance with the present disclosure, including but not limited to those illustrated in FIGS. 8A-12B. The arrangement of the source elements 1551-1 through 1551-n is not meant to limit the particular geometry of the source subarray 1592. A controller 1591 can be coupled to the source subarray 1592. The controller 1591 can be configured to actuate the source elements 1551-1 through 1551-n individually according to an actuation sequence. The actuation sequence can be at least partially based on a relative position of each source element 1551 within a particular geometry of the source subarray 1592 with respect to a previously actuated source element 1551; and a towing velocity of the source subarray 1592.

The source elements 1551-1 through 1551-n can be air guns. The source subarray 1592 can comprise the air guns 1551-1 through 1551-n arranged in a particular geometry. The controller 1591 can be configured to actuate the air guns 1551-1 through 1551-n individually according to an actuation sequence that is at least partially based on a towing velocity of the source subarray 1592 such that the actuation of each of the air guns 1551-1 through 1551-n occurs at least partially outside bubbles formed by previous actuations of the air guns 1551-1 through 1551-n according to the actuation sequence; and refill each of the air guns 1551-1 through 1551-n individually after each of the air guns 1551-1 through 1551-n has been actuated such that the actuations of each of the air guns 1551-1 through 1551-n are continuous or near continuous. Refilling each of the air guns 1551-1 through 1551-n individually as opposed to refilling the air guns 1551-1 through 1551-n together can enable more efficient use of a compressor because the compressor can fully refill the air guns 1551-1 through 1551-n because the compressor is refilling one air gun instead of n air guns. Thus, the overall power over time of the source subarray 1592 where the air guns 1551-1 through 1551-n are refilled and actuated individually can be greater the power of the source subarray 1592 where the air guns 1551-1 through 1551-n are refilled and actuated simultaneously. The controller 1591 can be further configured to actuate the air guns 1551-1 through 1551-n with a time interval between the actuations. The time interval can be such that the actuation of each of the air guns 1551-1 through 1551-n occurs at least partially outside bubbles formed by a previously actuated air gun 1551-1 through 1551-n according to the actuation sequence.

In accordance with a number of embodiments of the present disclosure, a geophysical data product may be produced. The geophysical data product may include, for example, a marine seismic survey measurement with an estimated acquisition effect removed therefrom. Geophysical data may be obtained and stored on a non-transitory, tangible computer-readable medium. The geophysical data product may be produced by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. For example, source elements of a source subarray can be individually actuated according to an actuation sequence. The actuation sequence can be at least partially based on a relative position of each of the source elements within a particular geometry of the source subarray with respect to a previously actuated source element and a towing velocity of the source subarray.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for individual actuation within a source subarray, comprising:
   individually actuating source elements of a source subarray according to an actuation sequence,
   wherein the actuation sequence is at least partially based on:
      a relative cross-line position and a relative depth of each of the source elements within a particular geometry of the source subarray with respect to a previously actuated source element of the source subarray; and
      a towing velocity of the source subarray.

2. The method of claim 1, wherein the actuation sequence is at least partially based on a time interval between the actuations, wherein a duration of the time interval is less than a second.

3. The method of claim 1, wherein the actuation sequence is at least partially based on a time interval between the actuations, wherein a duration of the time interval varies randomly.

4. The method of claim 1, wherein the actuation sequence is at least partially based on a time interval between the actuations, wherein a duration of the time interval varies randomly within a mean time interval plus a randomization range and the mean time interval minus the randomization range.

5. The method of claim 1, wherein the actuation sequence is at least partially based on a time interval between the actuations, wherein the time interval has a predetermined duration.

6. The method of claim 1, wherein the actuation sequence comprises actuating the source elements with a first time interval between a first pair of consecutive actuations and a second time interval between a second pair of consecutive actuations, wherein the first time interval has a different duration than the second time interval.

7. The method of claim 1, further comprising:
   repeating the actuation of the source elements according to the actuation sequence after all of the source elements of the source subarray have been actuated.

8. The method of claim 1, further comprising:
   actuating source elements of additional source subarrays according to the actuation sequence,
   wherein the actuation sequence includes actuating a first source element in the source subarray and each of the additional source subarrays before actuating a second source element in each of the source subarrays.

9. A system for individual actuation within a source subarray, comprising:
   a source subarray comprising source elements; and
   a controller coupled to the source subarray and configured to actuate the source elements individually according to an actuation sequence,
   wherein the actuation sequence is at least partially based on:
      a relative cross-line position and a relative depth of each of the source elements within a particular geometry of the source subarray with respect to a previously actuated source element of the source subarray; and
      a towing velocity of the source subarray.

10. The system of claim 9, wherein the particular geometry comprises the source elements arranged in a substantially elliptical shape.

11. The system of claim 9, wherein the particular geometry comprises the source elements arranged in a substantially rectangular shape.

12. The system of claim 9, wherein the particular geometry comprises four of the source elements in a single inline position along the source subarray.

13. The system of claim 9, wherein the particular geometry comprises a first source element at a first cross-line position and a second source element at a second cross-line position, wherein the first cross-line position is different than the second cross-line position.

14. The system of claim 9, wherein the particular geometry comprises a first source element at a first depth and a second source element at a second depth, wherein the first depth is different than the second depth.

15. The system of claim 9, wherein the particular geometry comprises the source elements arranged along at least one line.

16. The system of claim 15, wherein the at least one line is a single line;
- wherein an initial source element of the source elements is disposed at an inline position along the single line that is closest to a water surface; and
- wherein the actuation sequence includes actuating the source elements beginning with the initial source element followed by actuating, in order along the single line, the source elements positionally subsequent to the initial source element.

17. The system of claim 15, wherein the at least one line comprises a first line and a second line, wherein the first and second lines share an endpoint; and
- wherein an angle between the first and second lines is less than 180 degrees.

18. The system of claim 15, wherein the at least one line comprises a first line and a second line, wherein the first and second lines are substantially vertical with respect to a water surface and substantially parallel to each other.

19. The system of claim 9, wherein the controller is further configured to repeat the actuation of the source elements according to the actuation sequence after all of the source elements of the source subarray have been actuated.

20. The system of claim 9, further comprising:
- a source array, wherein the source array comprises the source subarray and an additional source subarray; and
- wherein the controller is configured to actuate source elements of the additional source subarray according to the actuation sequence.

21. The system of claim 20, wherein the controller is further configured to actuate a first source element of the source subarray and a first source element of the additional source subarray before actuating a second source element of the source subarray and a second source element of the additional source subarray.

22. A system for individual actuation within a source subarray, comprising:
- a source subarray comprising air guns, wherein the air guns are arranged in a particular geometry; and
- a controller coupled to the source subarray and configured to:
  - actuate the air guns individually according to an actuation sequence that is at least partially based on a towing velocity of the source subarray such that:
    - the actuation of each of the air guns occurs at least partially outside bubbles formed by previous actuations of the air guns according to the actuation sequence; and
    - an actuation of an air gun of the source subarray occurs within a bubble period of a prior actuation of another air gun of the source subarray; and
  - refill each of the air guns individually after each of the air guns has been actuated such that the actuations of each of the air guns are continuous or near continuous.

23. The system of claim 22, wherein the controller is further configured to actuate the air guns with a time interval between the actuations,
- wherein the time interval is such that the actuation of each of the air guns occurs at least partially outside bubbles formed by a previously actuated air gun according to the actuation sequence.

24. A method of generating a geophysical data product, the method comprising:
- obtaining geophysical data; and
- processing the geophysical data to generate the geophysical data product, wherein processing the geophysical data comprises:
  - individually actuating source elements of a source subarray according to an actuation sequence,
  - wherein the actuation sequence is at least partially based on:
    - a relative cross-line position and a relative depth of each of the source elements within a particular geometry of the source subarray with respect to a previously actuated source element; and
    - a towing velocity of the source subarray.

25. The method of claim 24, further comprising recording the geophysical data product on a non-transitory machine-readable medium suitable for importing onshore.

26. The method of claim 24, wherein processing the geophysical data comprises processing the geophysical data offshore or onshore.

* * * * *